United States Patent
Saichi et al.

(10) Patent No.: US 6,614,139 B2
(45) Date of Patent: Sep. 2, 2003

(54) MOTOR HAVING A DYNAMIC PRESSURE BEARING APPARATUS AND A MANUFACTURING METHOD THEREOF

(75) Inventors: Masayoshi Saichi, Nagano (JP); Takehiko Yazawa, Nagano (JP)

(73) Assignee: Sankyo Seiki Mfg. Co., Ltd., Nagano-ken (JP)

( * ) Notice: Subject to any disclaimer, the term of this patent is extended or adjusted under 35 U.S.C. 154(b) by 14 days.

(21) Appl. No.: 09/919,370

(22) Filed: Jul. 30, 2001

(65) Prior Publication Data
US 2002/0047396 A1 Apr. 25, 2002

(30) Foreign Application Priority Data

Aug. 7, 2000 (JP) .................................. 2000-239121

(51) Int. Cl.[7] .............................................. H02K 5/16
(52) U.S. Cl. ............................................... 310/90
(58) Field of Search ................................. 310/90, 90.5

(56) References Cited

U.S. PATENT DOCUMENTS 5,647,672 A * 7/1997 Fukutani ..................... 384/100
5,751,085 A * 5/1998 Hayashi ...................... 310/184
5,822,846 A * 10/1998 Moritan et al. .............. 29/598
5,998,898 A * 12/1999 Fukutani et al. ............. 310/90

* cited by examiner

Primary Examiner—Nestor Ramirez
Assistant Examiner—Nguyen N Hanh
(74) Attorney, Agent, or Firm—Hogan & Hartson, LLP

(57) ABSTRACT

A motor having a dynamic pressure bearing apparatus includes a fixed bearing member mounted to a motor frame, a rotating shaft member rotatably inserted with respect to the fixed bearing member and a lubricating fluid injected into a gap portion between the fixed bearing member and the rotating shaft member. The rotating shaft member is supported by a dynamic-pressure caused by the lubricating fluid. In addition, the motor frame is provided with a generally cylindrical bearing hold member that holds and fixes a bearing member. The bearing hold member includes a bearing contacting portion which abuts against the fixed bearing member or one part of the assembly including the fixed bearing member in an axial direction for positioning the fixed bearing member in a normal position in an axial direction.

32 Claims, 4 Drawing Sheets

US 6,614,139 B2

MOTOR HAVING A DYNAMIC PRESSURE BEARING APPARATUS AND A MANUFACTURING METHOD THEREOF

BACKGROUND OF THE INVENTION

1) Field of the Invention

The present invention relates to a motor having a dynamic pressure bearing apparatus and a manufacturing method thereof, and more particularly to a motor including a dynamic pressure bearing apparatus rotatably supporting a rotor shaft member with respect to a fixed bearing member.

2) Related Art

In recent years, a motor with a dynamic pressure bearing apparatus which rotatably supports a rotating shaft has been used to rotate components such as magnetic disks, polygon mirrors or optical disks at high speeds. Motors having a dynamic pressure bearing apparatus as shown in FIG. 4, for example, include a rotating shaft member 2 rotatably inserted into a bearing sleeve 3 as a fixed bearing member. The rotating shaft member 2 is mounted in a rotating hub 1 to carry a recording disc.

A radial dynamic pressure bearing RB is formed of a dynamic pressure face provided on the outer circumferential face of the rotating shaft member 2 and a dynamic pressure face provided on the internal circumferential face of the bearing sleeve 3. These two faces are disposed with a narrow gap radially and a lubricating fluid such as air or oil is contained in the gap.

A thrust plate 4 is fixed to the rotating shaft member 2 and two dynamic pressure faces provided by the thrust plate 4 and a dynamic pressure face of the bearing sleeve 3 and a counter plate 5 are disposed to be faced in proximity in an axial direction with a predetermined narrow gap. A lubricating fluid such as air or oil is injected into the narrow gap of a thrust dynamic pressure bearing SB.

The lubricating fluid is pressurized by a pumping operation of a fluid compression means (not shown), that is, dynamic pressure generating grooves provided on at least one of the dynamic pressure faces in the radial dynamic pressure bearing RB and the thrust dynamic pressure bearing SB. Thus, the rotor shaft member 2 is rotated in a floated condition in a radial direction and in a thrust direction respectively by means of the resultant dynamic pressure.

A motor having the dynamic pressure bearing apparatus is assembled using the following steps. A rotor hub 1 is first fixed to a rotating shaft member 2 and the rotating shaft member 2 is inserted inside a bearing sleeve 3. A thrust plate 4 is then accommodated in an end portion of the rotating shaft member 2. A counter plate 5 is then mounted to an aperture portion of the bearing sleeve 3 providing the thrust plate 4 between the counter plate 5 and the bearing sleeve 3. A radial clearance between the counter plate 5 and the bearing sleeve 3 is then sealed by adhesive material 6

When oil is used as the lubricating fluid, deaeration in the radial dynamic pressure bearing RB and the thrust dynamic pressure bearing SB of the bearing assembly occurs. The oil is filled inside each of the bearing sections by the vacuum attraction force generated at the time of deaeration. After removing excess oil which stuck to the bearing assembly, a ring-shaped rotor magnet 7 is fixed to the internal circumferencial face of the rotor hub 1 by an adhesive material, intervened with a back yoke plate between them.

Alternatively, in the case where a motor frame 11 on which a flexible circuit board is installed and intervened with an insulating paper, a stator core 13 with a stator coil 12 wound thereon is fitted and fixed to a core holder 14 with encapsulated electrical wiring. In the internal circumference of the core holder 14 of the stator assembly, the bearing sleeve 3 of the rotor assembly is inserted and fixed by adhesion.

In this case, when assembling the stator and the rotor, the appropriate positional relationship between the stator assembly and the rotor assembly is attained with a jig. Using the jig, the stator assembly and the rotor assembly are assembled such that a predetermined positional relationship is maintained between the assemblies.

Establishing the proper positional relationship between the stator assembly and the rotor assembly using the jig is very difficult and time consuming. In particular, when a motor accommodates a media disc, it is necessary to adjust the height parallelism of the disc placing face of the rotor assembly with a high degree of accuracy with respect to the reference plane of the stator assembly. In addition, be allocated for the adhesive material used to solidify.

Therefore, many hours are required to adjust the jig. This causes a reduction in productivity. Furthermore, many highly precise jigs must be prepared, which leads to the problem of increased cost for the manufacturing facility. Therefore it is desirable to provide a motor including a dynamic pressure bearing apparatus, that can be assembled with a stator assembly and a rotor assembly with a level of ease and with a high degree of accuracy.

SUMMARY OF THE INVENTION

A motor having a dynamic pressure bearing apparatus includes a fixed bearing member mounted to a motor frame, a rotating shaft member rotatably inserted with respect to the fixed bearing member and a lubricating fluid injected into a gap portion between the fixed bearing member and the rotating shaft member. The rotating shaft member is supported by a dynamic-pressure caused by the lubricating fluid. In addition, the motor frame is provided with a generally cylindrical bearing hold member that holds and fixes a bearing member. The bearing hold member includes a bearing contacting portion which abuts against the fixed bearing member or one part of the assembly including the fixed bearing member in an axial direction for positioning the fixed bearing member in a normal position in an axial direction.

Other features and advantages of the invention will be apparent from the following detailed description, taken in conjunction with the accompanying drawings that illustrate, by way of example, various features of embodiments of the invention.

PREFERRED EMBODIMENTS OF THE INVENTION

Figure 1:
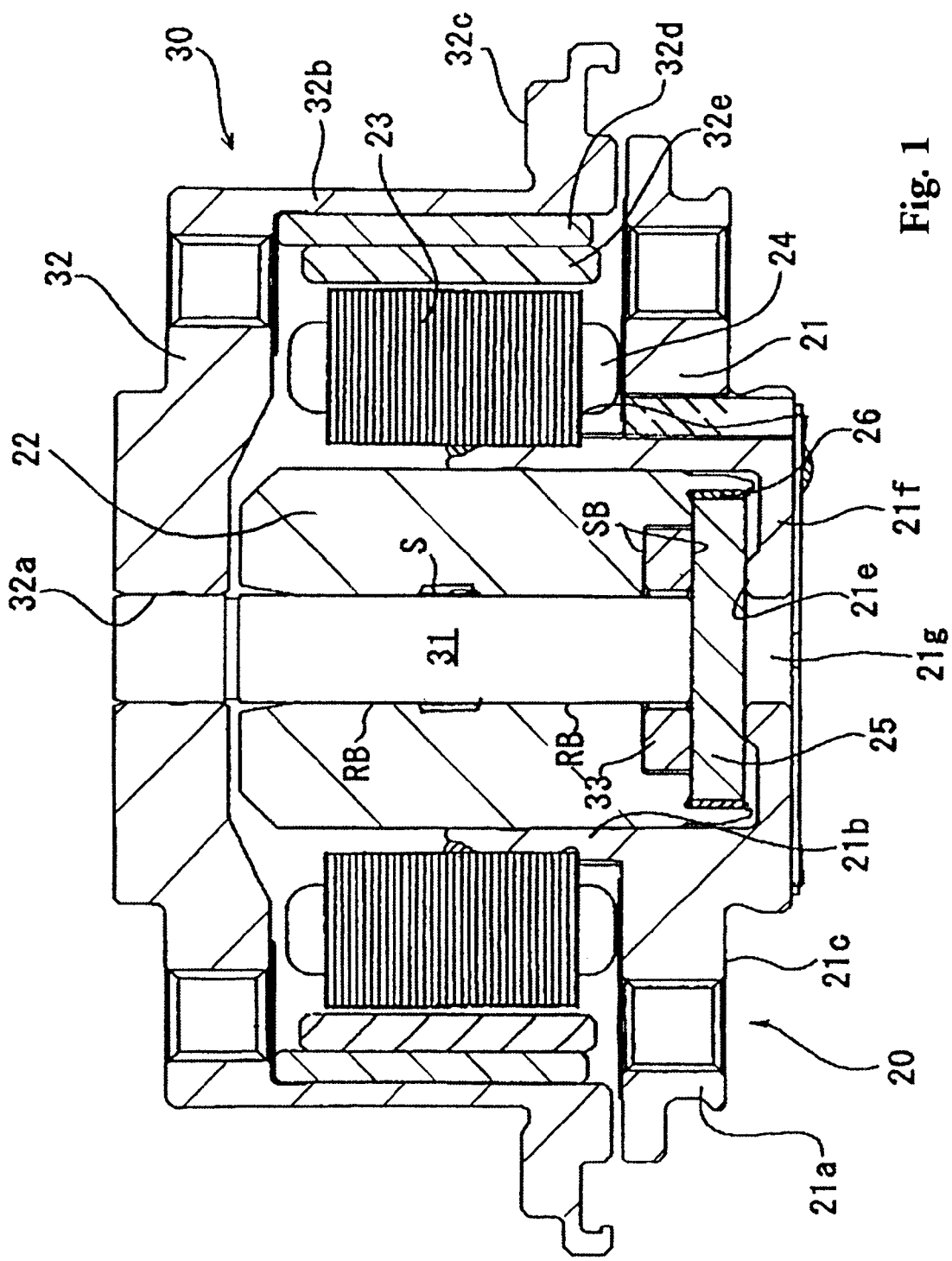
FIG. 1 shows the longitudinal sectional view of a structural example of a hard disk drive (HDD) motor having a dynamic pressure bearing apparatus according to one embodiment of the present invention.

Embodiments of the present invention are directed to a motor having a dynamic pressure bearing apparatus. The dynamic pressure bearing apparatus includes a fixed bearing member mounted to a motor frame, a rotor shaft member rotatably inserted with respect to the fixed bearing member and a lubricating fluid injected into a gap portion between the fixed bearing member and the rotor shaft member. The rotor shaft member is supported by a dynamic-pressure caused by the lubricating fluid. In addition, the motor frame is provided with a generally cylindrical bearing hold member that holds and fixes to a bearing member. The bearing hold member includes a bearing contacting portion which abuts against the fixed bearing member or one part of the assembly including the fixed bearing member in an axial direction for positioning the fixed bearing member in a normal position in an axial direction. Since the bearing holder is formed integrally or is fixed to the motor frame, the bearing contacting portion can determine a position of the fixed bearing member in the set or determined position in an axial direction.

As a result, when the fixed bearing member is mounted to the bearing holder of the motor frame, the fixed bearing member or one part of its assembly is abutted and supported by the bearing contacting portion which is provided by the bearing holder, and the fixed bearing member is precisely positioned in an axial direction. Thus the use of the conventional jig is unnecessary, and the positioning of the rotor assembly and the stator assembly can be conducted cheaply and easily.

According to another embodiment of the present invention, the fixed bearing member can be fixed by adhesive material to the bearing holder.

In accordance to another embodiment of the present invention, the fixed bearing member is mounted in the internal circumference of the bearing holder and a stator core is fitted in the outer circumferential surface of the bearing holder. The bearing holder has a core positioning portion which contacts and determines the position of the stator core by abutting to the stator core in an axial direction. The motor frame is preferably provided with a reference surface as a positional reference surface for the motor when the motor is installed to a main apparatus.

According to one aspect of the present invention, the bearing contacting portion may have an air or ventilation hole in the center section of the bearing holder in an axial direction. The rotor shaft member is preferably mounted with a hub which carries one or more recording discs.

A manufacturing method of a motor having a dynamic pressure bearing apparatus includes the steps of rotatably inserted a rotating shaft member into a fixed bearing member to form a bearing assembly, injecting lubricating fluid into a gap portion between the fixed bearing member and the rotating shaft member and mounting the bearing assembly in a motor frame or an assembly including the motor frame.

According to one aspect of the present invention, the motor frame or the assembly of the motor frame is provided with a generally cylindrical bearing holder for mounting and fixing the fixed bearing member. The bearing holder is provided with a bearing contacting portion which abuts with one portion of the bearing assembly. When the fixed bearing member of the bearing assembly is mounted in the bearing holder, the one portion of the bearing assembly abuts against the bearing contacting portion of the bearing holder in an axial direction so that the fixed bearing member is positioned in the determined position in an axial direction.

In accordance with one embodiment of the present invention, an injection step of the lubricating fluid is performed after the assembling process of the bearing assembly and before the mounting process of the bearing assembly to the motor frame or the assembly of the motor frame.

In accordance with another embodiment of the present invention, when the fixed bearing member is mounted to the bearing holder of the motor frame, the fixed bearing member or one portion of the assembly of the fixed bearing member abuts against the bearing contacting portion provided by the motor frame. Thus the fixed bearing member is positioned in a predetermined position with respect to the axial direction, and so the rotor shaft member is also positioned in a predetermined position. Therefore, the jigs conventionally used will be unnecessary, the positioning operations of the rotor assembly and the stator assembly are achieved cheaply and effectively.

In addition, when the mounting step of the parts, such as the stator core to the bearing holder, is performed independently of the injection step of the lubricating fluid, the assembly operations can be achieved effectively almost without contamination of the lubricating fluid during the injection step. The bearing member or the bearing member's assembly is precisely positioned in an axial direction with respect to the stator reference surface of the stator.

In accordance with one embodiment of the present invention, when the fixed bearing member, together with the rotating shaft member, is inserted into the bearing holder of the motor frame, the trapped air between the fixed bearing member and the bearing holder is released through an air-hole. As a result, the mounting process of the fixed bearing member to the bearing holder is performed easily without problems due to trapped air, for example, the leaking of lubricating fluid and unwanted dispersion of adhesive material. Such operations are effective especially in a disk driving apparatus where highly precise positioning is needed.

One embodiment of the present invention will be explained below. First, an overall structure of a hard disk drive (HDD) to which the present invention may be applied will be explained with reference to the accompanying drawings.

A shaft-rotating spindle motor for a HDD shown in FIG. 1 generally includes a stator assembly 20, which is a fixed member and a rotator assembly 30, which is a rotating member assembled on top of the stator assembly 20. The stator assembly 20 has a fixing frame 21 screwed onto a fixed base (not shown). The fixing frame 21 is formed from a metal material such as aluminum in order to reduce its weight.

A bearing holder 21b is formed upright in the generally center area of a circular portion 21a of the fixing frame 21. The bearing holder 21b includes a circular cylindrical portion formed so as to extend generally vertically. A stator reference surface 21c is formed in the under surface of the circular portion 21a. The stator reference surface 21c abuts against the base of a main apparatus (not shown) and is used as a clamping reference surface of the entire motor, and therefore the motor is mounted with high accuracy.

A bearing sleeve 22 in a hollow cylinder shape, which is a fixed bearing member, is attached to an inner circumference of the bearing holder 21b and joined to the bearing holder 21b through press fit or shrink fit. The bearing sleeve 22 is formed from a copper-alloy material such as phosphor bronze in order for ease of working a bearing hole with a small diameter.

On the outer circumference mounting surface of the bearing holder 21b is mounted a stator core 23 including a stacked layered body of electromagnetic steel plates. A drive coil 24 is wound on each of the salient pole sections provide on the stator core 23.

A bearing hole is provided in the center of the bearing sleeve 22. A part of the rotor assembly 30, which is a rotating shaft member 31, is inserted inside the bearing hole. The rotating shaft 31 in the present embodiment is formed from stainless steel. This means that the bearing sleeve 22 which is a bearing member, is formed from a material with more resilience than the rotating shaft 31, which is a shaft member.

On the inner circumference surface of the bearing hole of the bearing sleeve 22 is formed a dynamic pressure surface, which is positioned to face in the radial direction of dynamic pressure surface formed on the outer circumference surface of the rotating shaft 31, such that a radial dynamic pressure bearing section RB is created in a minute gap between the dynamic pressure surfaces. More specifically, the dynamic pressure surface on the bearing sleeve 22 side and the dynamic pressure surface on the rotating shaft 31 side in the radial dynamic pressure bearing section RB face each other across a minute gap of a few micrometers; this minute gap forms a bearing space into which a lubricating fluid is continuously charged in the axial direction. The lubricating fluid consisting of oil or a magnetic fluid is injected into the bearing space.

A fluid-storage space portion S is provided between the two radial dynamic pressure bearing portions RB, and the bearing gap space including the fluid-storage space portion S and the two radial dynamic pressure bearing portions RB are filled with the lubricating fluid continuously in an axial direction.

Radial dynamic-pressure generating grooves in a spiral shape or a herringbone shape, for example, are provided on at least one of the dynamic pressure surfaces on the bearing sleeve 22 and the rotating shaft 31 in two blocks of concave ring shapes separated in the axial direction. When rotation takes place, the pumping action of the grooves pressurizes the lubricating fluid to generate dynamic pressure, so that the rotating shaft 31 and a rotating hub 32 are shaft-supported in the radial direction.

At the bottom end of the rotating shaft 31 is fixed a disk-shaped thrust plate 33. The thrust plate 33 is contained in a cylinder-shaped concave recess formed at the bottom center of the bearing sleeve 22. In the recess of the bearing sleeve 22, the dynamic pressure surface provided on the top surface of the thrust plate 33 faces in close proximity the dynamic pressure surface provided on the bearing sleeve 22. A dynamic pressure generating groove is formed on at least one of the two facing dynamic pressure surfaces, and a top thrust dynamic pressure bearing section SB is formed in the gap between the dynamic pressure surfaces of the thrust plate 33 and the bearing sleeve 22 facing each other.

In close proximity to the bottom dynamic pressure surface of the thrust plate 33 is a counter plate 25, which is formed from a disk-shaped member with a relatively large diameter. The counter plate 25 closes off the bottom opening area of the bearing sleeve 22. A dynamic pressure generating groove is also formed between the dynamic pressure surface provided at the top of the counter plate 25 and the dynamic pressure surface on the bottom of the trust plate 25, which forms a bottom thrust dynamic pressure bearing section SB.

As described above, the two dynamic pressure surfaces of the thrust plate 33 and the dynamic pressure of the bearing sleeve 22 and of the counter plate 25 that faces them together constitute a set of thrust dynamic pressure bearing sections SB next to each other in the axial direction and are in each case arranged so that the opposing dynamic pressure surfaces face each other across a minute gap of a few micrometers; and the lubricating fluid is charged continuously into the minute gaps in the axial direction via a path provided on the outer circumference of the thrust plate 33.

Furthermore, normal herringbone-shaped or spiral shaped thrust dynamic pressure generating grooves in a ring shape are provided on at least one of the dynamic pressure surfaces of the thrust plate 33 and that of the bearing sleeve 22, and on at least one of the dynamic pressure surface of the thrust plate 33 and that of the counter plate 25. As a result, when rotation takes place, the pumping action of the thrust dynamic pressure generating grooves pressurizes the lubricating fluid to generate a dynamic pressure and the rotating shaft 31 and the rotating hub 32 are supported in the thrust direction.

The rotor hub 32, which includes the rotor assembly 30 along with the rotating shaft 31, is made of a generally cup-shaped member which includes a metal such as aluminum or aluminum alloys, so that the rotor hub 32 can support recording discs such as magnetic discs (not shown). The rotor hub 32 is joined unitedly by press fitting or shrink fitting with the upper end portion of the rotor shaft 31, and therefore, a junction hole 32a is provided in the center section of the rotor hub 32. The rotor hub 32 has a generally cylindrical portion 32b for carrying recording discs in an outer circumferential portion. Recording discs are put on and mounted on the disc placing surface 32c which is stretched in a radial direction outwardly from the cylindrical portion 32b.

A ring-shaped driving magnet 32e is mounted to an internal circumferencial face of the cylindrical portion 32b with an intervening back yoke 32d between them. The ring-shaped driving magnet 32e is circumferentially disposed in facing closely with the outer circumferential surface of salient pole portions of the stator core 23.

A bearing contacting portion 21e is provided in a bottom part of the cylindrical portion including the bearing holder 21b as a bearing holding member. The bearing contacting portion 21e abuts the counter plate 25 mounted in the bearing sleeve 22 in an axial direction. The bearing contacting portion 21e is formed by a convex-shaped portion which extends in an axial direction toward the inside of the bearing holder 21b (upward in FIG. 1). The bearing contacting portion 21e is formed in an internal circumference end portion of a support disc portion 21f, which extends internally from a bottom end of a cylindrical portion of the bearing holder 21b. The upper face of the convex-shaped portion of the bearing contacting portion 21e is abutted with an under surface of the counter plate 25, so that the counter plate 25 and the bearing sleeve 22 can be positioned at the predetermined and normal position in an axial direction.

The predetermined and normal position of the bearing sleeve 22, which is positioned by means of the bearing contacting portion 21e, is a position that the disc placing face 32c of the rotor hub 32 is positioned within a predetermined tolerance dimension in an axial direction with respect to the stator reference surface 21c of the fixing frame 21.

In addition, an air-hole 21g for ventilation is formed in the center of the bearing contacting portion 21e. The air-hole 21g is provided for exhausting the compressed air from the space which is formed in the inside of the bearing holder 21b when the outer circumferential surface of the bearing sleeve 22, together with the rotating shaft 31, the rotor hub 32, the thrust plate 33, and the counter plate 25, is inserted along the internal circumferencial surface of the bearing holder 21b.

A hard disk drive (HDD), that is, a motor having a dynamic pressure bearing apparatus is manufactured using the following steps.

First the rotor hub 32 is fixed to the rotating shaft 31 and the required finishing work is conducted. Afterward, the thrust plate 33 is fitted to an end of the rotating shaft 31, and then the counter plate 25 is mounted to an aperture portion of the bearing sleeve 22 so as to be put the thrust plate 33 between the bearing sleeve 22 and the counter plate 25. The radial clearance between the counter plate 25 and the bearing sleeve 22 is sealed by adhesive material 26, and thus the bearing assembly is assembled.

Next, when a liquid or an oil is used as lubricating fluid, the inside of the bearing sleeve 22 is deaerated and the lubricating fluid is injected into the inside of the bearing sleeve 22 by means of the vacuum attraction force during the deaeration. And after having removed the extra oil adhereing to the outside of the bearing assembly such as the bearing sleeve 22, the ring-shaped magnet 32e is fixed to the internal circumference surface of the rotor hub 32 by an adhesive material, the back yoke 32d intervening between them. Thus the rotor assembly is assembled.

A circuit board is added to the fixing frame 21 over an insulating paper. After the stator core 23 wound with the driving coil 24 is fitted to the outer circumferential surface of the bearing holder 21b, the electric wiring/encapsulation is performed, and a stator assembly is assembled. And, the bearing sleeve 22 is inserted into the internal circumference surface of the bearing holder 21b and is fixed by adhesive material, then the assembly of the motor is completed.

In a hard disk drive (HDD) apparatus depending on such an embodiment, when the bearing sleeve 22 composing the bearing assembly is mounted to the bearing holder 21b of the fixing frame 21, an under surface of the counter plate 25 which composes a bearing assembly along with the bearing sleeve 22 is abutted with the bearing contacting portion 21e provided in the fixing frame 21 in an axial direction.

As a result, the bearing assembly including the bearing sleeve 22 is positioned in the normal position with respect to an axial direction, the stator reference surface 21c and the disc placing surface 32c of the rotor hub 32 are disposed with a highly precise position relationship. That is to say, in accordance with the present embodiment, the positioning of the rotor assembly and the stator assembly is cheaply and effectively attained without jigs used conventionally. Especially in a motor apparatus carrying recording discs where a highly precise positioning is needed, the effect is outstanding.

In the occasion of the assembling of the rotor assembly and the stator assembly, the mounting step of each part, for example, the stator core 23 with respect to the bearing holder 21b, is executed discretely and independently with the injection step of a lubricating fluid into the bearing sleeve 22 composing the bearing assembly. Therefore, the assembly working of each part of the stator assembly is done effectively without incurring contamination during the injection step of the lubricating oil.

In addition, in the present embodiment, when the bearing sleeve 22 together with the counter plate 25 is mounted to the bearing holder 21b of the fixing frame 21, the air which is pressurized between the bearing sleeve 22 and the bearing holder 21b is exhausted outside through the air-hole 21g.

Thus the mounting working for the bearing holder 21b to the fixing frame 21 is easily done without air resistance, and the external leak of the lubricating fluid and the dispersion of the adhesive material by compression of air can be avoided.

Figure 2:
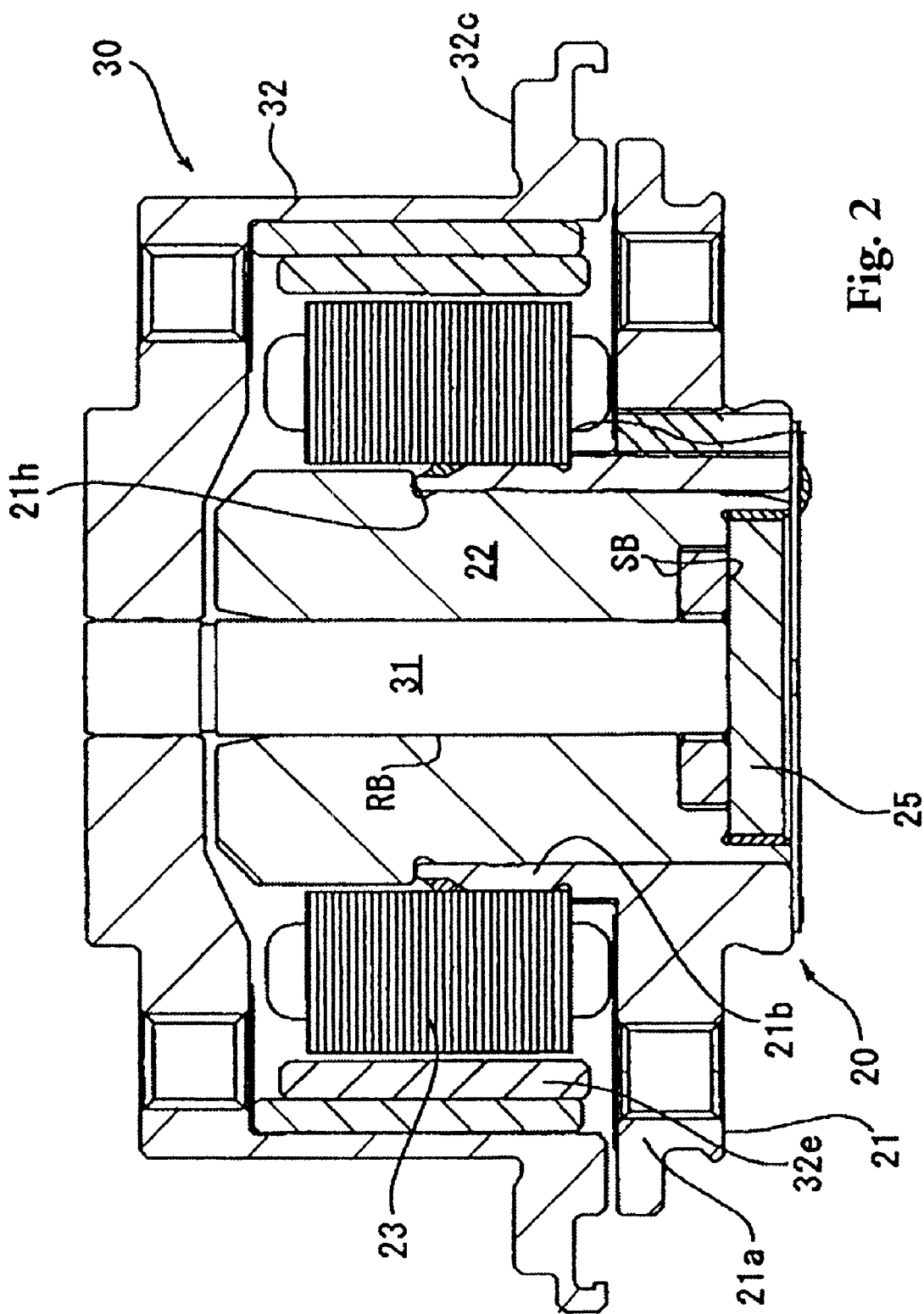
FIG. 2 shows a longitudinal sectional view of the HDD motor according to another embodiment of the present invention.

In an embodiment shown in FIG. 2, the same reference number is referred to the same member or the same part corresponding to the first embodiment. In FIG. 2, the bearing contacting portion 21h is provided in an upper end of the bearing holder 21b which abuts with the bearing sleeve 22 in an axial direction.

The bearing contacting portion 21h is formed in the upper end of the bearing holder 21b and abuts with the flat portion of the bearing sleeve 22 where an upper half portion of the bearing sleeve 22 is enlarged outwardly in a radial direction. The flat portion abuts against the bearing contacting portion 21h of the bearing holder 21b in an axial direction and the bearing assembly including the bearing sleeve 22 is set to the normal (predetermined by design) position in an axial direction. In this embodiment, the operation/effect can be attained as similar as the first embodiment.

Figure 3:
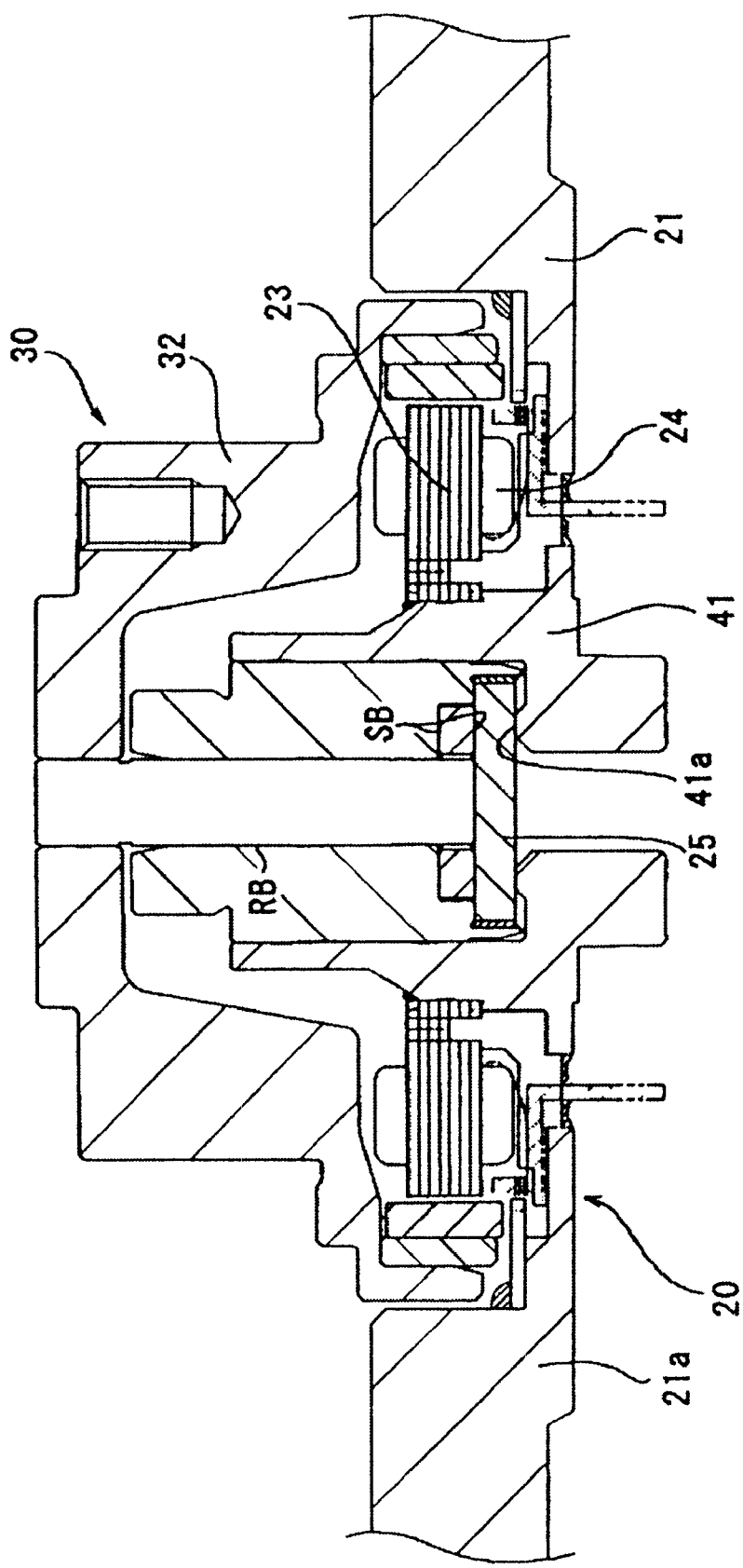
FIG. 3 shows a longitudinal sectional view of the HDD motor according to a further embodiment of the present invention.
Figure 4:
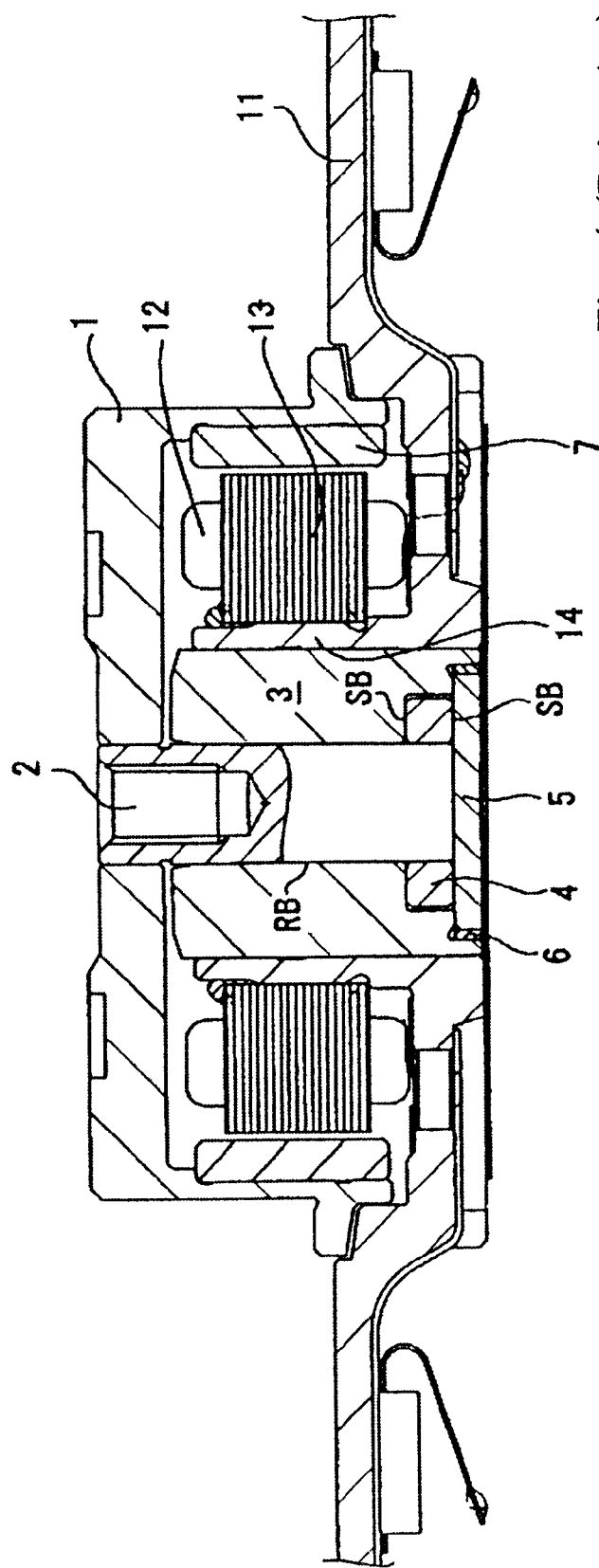
FIG. 4 shows a cross-sectional view of the HDD motor including a conventional dynamic pressure bearing apparatus.

Furthermore, in an embodiment of FIG. 3, the same reference number is referred to the same member or the same part corresponding to the first embodiment. In FIG. 3, a stator core 23 is mounted directly to a base plate 41 composing an apparatus main base. In this embodiment, a bearing contacting portion 41a which is provided in the base plate 41 is abutted against the counter plate 25 composing a bearing assembly in an axial direction. Also in such an embodiment, the similar operation/effect can be attained.

While the description above refers to particular embodiments of the present invention, it will be understood that many modifications may be made without departing from the spirit thereof. The accompanying claims are intended to cover such modifications as would fall within the true scope and spirit of the present invention.

For example, besides a hard disk drive (HDD) motor, the present invention can be also applied to various motors having various-type dynamic-pressure bearings, such as a motor for a polygon mirror.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A motor having a dynamic pressure bearing apparatus comprising:
   a fixed bearing member mounted to a motor frame;
   a rotating shaft member rotatably inserted with respect to the fixed bearing member;
   a lubricating fluid injected into a gap portion between the fixed bearing member and the rotating shaft member;
   the rotating shaft member being supported by a dynamic-pressure caused by the lubricating fluid,
   wherein the motor frame is provided with a generally cylindrical bearing hold member which holds and fixes the bearing member, wherein the bearing hold member includes a bearing contacting portion that bears against a counter plate at a contact location, and wherein the contact location is radially aligned with a thrust dynamic pressure bearing section.

2. The motor having a dynamic pressure bearing apparatus according to claim 1, wherein said fixed bearing member is fixed to said bearing hold member by an adhesive material.

3. The motor having a dynamic pressure bearing apparatus according to claim 1, wherein said fixed bearing member is fixed to the internal circumference of the bearing hold member, and a stator core is fitted to an outer periphery of the bearing hold member.

4. The motor having a dynamic pressure bearing apparatus according to claim 3, wherein the bearing hold member includes a core contacting portion which abuts in an axial direction with one part of the stator core for positioning the stator core in an axial direction.

5. The motor having a dynamic pressure bearing apparatus according to claim 1, wherein the motor frame is provided with a position reference surface which is a stator reference surface when the motor is installed to a main apparatus body, and the fixed bearing member is positioned in a normal position in an axial direction with respect to the stator reference surface by the bearing contacting portion which is provided in the bearing hold member.

6. The motor having a dynamic pressure bearing apparatus according to claim 5, wherein the rotating shaft member is mounted with a hub carrying a recording disc and a disc placing surface of the hub is positioned in a normal position in an axial direction with respect to the stator reference surface.

7. The motor having a dynamic pressure bearing apparatus according to claim 1, wherein the bearing contacting portion is provided with an air-hole which is formed in the center section of the bearing contacting portion which is formed in the bearing hold member in an axial direction.

8. The motor having a dynamic pressure bearing apparatus according to claim 1, wherein the bearing contacting portion is formed to abut against a step portion in the axial direction of the fixed bearing member.

9. A motor having a dynamic pressure bearing apparatus comprising:
  a fixed bearing member mounted to a motor frame or a bearing mounting member fixed to the motor frame;
  a rotating shaft member rotatably inserted with respect to the fixed bearing member;
  a lubricating fluid injected into a gap portion between the fixed bearing member and the rotating shaft member;
  the rotating shaft member is supported by a dynamic-pressure caused by the lubricating fluid,
  wherein the motor frame or bearing mount member fixed to the motor frame is provided with a generally cylindrical bearing hold member which holds and fixes the bearing member, wherein the bearing hold member includes a bearing contacting portion that bears against a counter plate at a contact location, and wherein the contact location is radially aligned with a thrust dynamic pressure bearing section.

10. The motor having a dynamic pressure bearing apparatus according to claim 9, wherein the fixed bearing member is fixed to the bearing hold member by an adhesive material.

11. The motor having a dynamic pressure bearing apparatus according to claim 9, wherein the fixed bearing member is fixed to the internal circumference of the bearing hold member, and a stator core is fitted to an outer periphery of the bearing hold member.

12. The motor having a dynamic pressure bearing apparatus according to claim 11, wherein the bearing hold member includes a core contacting portion which abuts in an axial direction with one part of the stator core for positioning the stator core in an axial direction.

13. The motor having a dynamic pressure bearing apparatus according to claim 9, wherein the motor frame is provided with a position reference surface which is a stator reference surface when the motor is installed to a main apparatus body, and the fixed bearing member is positioned in a normal position in an axial direction with respect to the stator reference surface by the bearing contacting portion which is provided in the bearing hold member.

14. The motor having a dynamic pressure bearing apparatus according to claim 13, wherein said rotating shaft member is mounted with a hub carrying a recording disc and a disc placing surface of the hub is positioned in a normal position in an axial direction with respect to the stator reference surface.

15. The motor having a dynamic pressure bearing apparatus according to claim 9, wherein the bearing contacting portion is provided with an air-hole which is formed in the center section of the bearing contacting portion which is formed in the bearing hold member in an axial direction.

16. The motor having a dynamic pressure bearing apparatus according to claim 9, wherein the bearing contacting portion is formed to abut against a step portion in the axial direction of the fixed bearing member.

17. A dynamic pressure bearing apparatus comprising:
  a fixed bearing member;
  a rotating shaft member rotatably inserted with respect to the fixed bearing member;
  a lubricating fluid disposed in a gap between the fixed bearing member and the rotating shaft member; and
  a bearing hold member that holds the fixed bearing member;
  wherein the rotating shaft member is supported by a dynamic pressure generated in the lubricating fluid;
  wherein the bearing hold member includes a contacting portion that bears against a counter plate at a contact location; and
  wherein the contact location is radially aligned with a thrust dynamic pressure bearing section.

18. The dynamic pressure bearing apparatus of claim 17, wherein the fixed bearing member is fixed to the bearing hold member by an adhesive material.

19. The dynamic pressure bearing apparatus of claim 17, wherein the fixed bearing member is fixed to an internal surface of the bearing hold member, and a motor stator core is fitted to an outer periphery of the bearing hold member.

20. The dynamic pressure bearing apparatus of claim 19, wherein the bearing hold member includes a core contacting portion that abuts in an axial direction with one part of the stator core to position the stator core in an axial direction.

21. The dynamic pressure hearing apparatus of claim 17, and further comprising a motor frame provided with a position reference surface that serves as a stator reference surface when the motor is installed to a main apparatus body, wherein the fixed bearing member is positioned in a normal position in an axial direction with respect to the stator reference surface by the contacting portion of the bearing hold member.

22. The dynamic pressure bearing apparatus of claim 21, wherein the rotating shaft member is mounted with a hub carrying a recording disc, and wherein a disc placing surface of the hub is positioned in a normal position in an axial direction with respect to the stator reference surface.

23. The dynamic pressure bearing apparatus of claim 17, wherein the contacting portion is provided with an air-hole formed in a central area of the contacting portion of the bearing hold member.

24. The dynamic pressure bearing apparatus of claim 17, wherein the contacting portion of the bearing hold member is formed to abut against a step portion in the axial direction of the fixed bearing member.

25. A dynamic pressure bearing apparatus comprising a fixed bearing member;

a rotating shaft member rotatably inserted with respect to the fixed bearing member;

a lubricating fluid disposed in a gap between the fixed bearing member and the rotating shaft member;

a bearing hold member that holds the fixed bearing member; and a counter plate;

wherein the fixed bearing member and the rotating shaft member define a radial dynamic pressure bearing region between them;

wherein the rotating shaft member and the counter plate form a thrust dynamic pressure bearing region between them;

wherein the bearing hold member includes a contacting portion that bears against the counter plate at a contact location;

wherein the contact location is at least partially inside an axial projection of an outer edge of the thrust dynamic pressure bearing region.

26. The dynamic pressure bearing apparatus of claim 25, wherein the fixed bearing member is fixed to the bearing hold member by an adhesive material.

27. The dynamic pressure bearing apparatus of claim 25, wherein the fixed bearing member is fixed to in internal circumference of the hearing hold member, and a stator core is fitted to an outer periphery of the bearing hold member.

28. The dynamic pressure bearing apparatus of claim 27, wherein the bearing hold member includes a core contacting portion that abuts in an axial direction with a part of the stator core to position the stator core in an axial direction.

29. The dynamic pressure bearing apparatus of claim 25, and further comprising a motor frame provided with a position reference surface that serves as a stator reference surface when the motor is installed to a main apparatus body, wherein the fixed bearing member is positioned in a normal position in an axial direction with respect to the stator reference surface by the contacting portion of the bearing hold member.

30. The dynamic pressure bearing apparatus of claim 29, wherein the rotating shaft member is mounted with a hub carrying a recording disc, and wherein a disc placing surface of the hub is positioned in a normal position in an axial direction with respect to the stator reference surface.

31. The dynamic pressure bearing apparatus of claim 25, wherein the contacting portion is provided with an air-hole formed in a central area of the contacting portion of the bearing hold member.

32. The dynamic pressure bearing apparatus of claim 25, wherein the contacting portion of the bearing hold member is formed to abut against a step portion in the axial direction of the fixed bearing member.

* * * * *